(12) United States Patent
Durocher

(10) Patent No.: US 12,454,913 B2
(45) Date of Patent: Oct. 28, 2025

(54) GAS TURBINE ENGINE COMPONENT WITH INTEGRAL HEAT EXCHANGER

(71) Applicant: Pratt & Whitney Canada Corp., Longueuil (CA)

(72) Inventor: Eric S. Durocher, Boucherville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/976,413

(22) Filed: Oct. 28, 2022

(65) Prior Publication Data
US 2024/0141836 A1    May 2, 2024

(51) Int. Cl.
| | |
|---|---|
| *F02C 7/00* | (2006.01) |
| *F02C 3/04* | (2006.01) |
| *F02C 7/22* | (2006.01) |
| *F23R 3/28* | (2006.01) |
| *F28D 7/16* | (2006.01) |
| *F28D 21/00* | (2006.01) |

(52) U.S. Cl.
CPC .................. *F02C 7/22* (2013.01); *F02C 3/04* (2013.01); *F23R 3/28* (2013.01); *F28D 7/1669* (2013.01); *F28D 2021/0026* (2013.01)

(58) Field of Classification Search
None
See application file for complete search history.

(56) References Cited

U.S. PATENT DOCUMENTS

| | | | | |
|---|---|---|---|---|
| 2,474,258 A | * | 6/1949 | Kroon | F02C 7/047 |
| | | | | 244/134 B |
| 3,040,519 A | * | 6/1962 | Rae | F02K 9/78 |
| | | | | 60/764 |
| 3,220,697 A | * | 11/1965 | Smuland | F01D 5/187 |
| | | | | 416/96 R |
| 3,616,508 A | * | 11/1971 | Wallett | F01D 5/282 |
| | | | | 416/214 R |
| 3,734,639 A | * | 5/1973 | Short | F02C 7/12 |
| | | | | 416/193 A |

(Continued)

FOREIGN PATENT DOCUMENTS

| | | |
|---|---|---|
| JP | 03015743 B2 | 3/1998 |
| WO | 2016056580 A1 | 4/2016 |

OTHER PUBLICATIONS

EP search report for EP23206832.0 dated Mar. 19, 2024.

*Primary Examiner* — Edwin Kang
(74) *Attorney, Agent, or Firm* — Getz Balich LLC

(57) ABSTRACT

An assembly is provided for a gas turbine engine. This engine assembly includes a vane array and a heat exchanger integrated with the vane array. The vane array includes an inner platform, an outer platform and a plurality of vanes. The inner platform extends circumferentially about a centerline and forms an inner peripheral boundary of a flowpath through the vane array. The outer platform extends circumferentially about the centerline and forms an outer peripheral boundary of the flowpath through the vane array. The vanes extend across the flowpath between the inner platform and the outer platform. The vanes include a first vane and a second vane. The heat exchanger includes a first vane passage and a second vane passage fluidly coupled with and downstream of the first vane passage. The first vane passage extends through the first vane. The second vane passage extends through the second vane.

20 Claims, 8 Drawing Sheets

(56) References Cited

U.S. PATENT DOCUMENTS

| | | | | |
|---|---|---|---|---|
| 3,740,949 | A | * | 6/1973 | Wolf ................... F02C 7/224 |
| | | | | 60/768 |
| 4,148,185 | A | * | 4/1979 | Somers ................. F02C 3/22 |
| | | | | 60/39.465 |
| 4,312,625 | A | | 1/1982 | Pinaire |
| 4,845,941 | A | | 7/1989 | Paul |
| 5,525,032 | A | * | 6/1996 | Kreis ................... F01D 5/085 |
| | | | | 415/115 |
| 2006/0042223 | A1 | | 3/2006 | Walker |
| 2007/0227160 | A1 | * | 10/2007 | Johnson ............... F28D 20/02 |
| | | | | 165/96 |
| 2009/0324400 | A1 | * | 12/2009 | Marini .................. F01D 1/02 |
| | | | | 415/189 |
| 2013/0028718 | A1 | * | 1/2013 | Strom .................. F01D 9/065 |
| | | | | 415/182.1 |
| 2014/0133989 | A1 | * | 5/2014 | Belmonte ............. F01D 9/02 |
| | | | | 416/204 A |
| 2014/0241863 | A1 | * | 8/2014 | Tardif .................. F02K 1/80 |
| | | | | 415/145 |
| 2015/0016983 | A1 | * | 1/2015 | Power .................. F01D 25/28 |
| | | | | 415/208.1 |
| 2016/0040605 | A1 | * | 2/2016 | Howarth ............... F02C 3/04 |
| | | | | 60/785 |
| 2017/0096945 | A1 | * | 4/2017 | Mueller ............... F01D 5/088 |
| 2017/0130610 | A1 | * | 5/2017 | Nanda .................. F01D 25/24 |
| 2017/0159489 | A1 | * | 6/2017 | Sennoun .............. F28D 7/1676 |
| 2017/0191500 | A1 | * | 7/2017 | Lobocki ............... F02C 7/04 |
| 2017/0314471 | A1 | * | 11/2017 | Sennoun .............. F28D 15/02 |
| 2019/0203644 | A1 | * | 7/2019 | Niergarth ............. F01D 5/142 |
| 2020/0358338 | A1 | | 11/2020 | Pal |
| 2020/0386189 | A1 | * | 12/2020 | Powell ................. F02K 3/11 |
| 2021/0340908 | A1 | | 11/2021 | Boucher |
| 2022/0243667 | A1 | * | 8/2022 | Rambo .................. F02C 3/22 |
| 2023/0340930 | A1 | * | 10/2023 | Dass ..................... F02K 7/16 |

* cited by examiner

GAS TURBINE ENGINE COMPONENT WITH INTEGRAL HEAT EXCHANGER

TECHNICAL FIELD

This disclosure relates generally to a gas turbine engine and, more particularly, to a heat exchanger for the gas turbine engine.

BACKGROUND INFORMATION

A gas turbine engine may include a heat exchanger such as a heater for heating various fluids such as fuel. A typical heater is a standalone device arranged outside of a core of the gas turbine engine and mounted to an engine case via mounting brackets. While known heaters have various advantages, there is still room in the art for improvement. There is a need in the art, for example, for a heater with a reduced impact on gas turbine engine size, weight and/or cost.

SUMMARY

According to an aspect of the present disclosure, an assembly is provided for a gas turbine engine. This engine assembly includes a vane array and a heat exchanger integrated with the vane array. The vane array includes an inner platform, an outer platform and a plurality of vanes. The inner platform extends circumferentially about a centerline and forms an inner peripheral boundary of a flowpath through the vane array. The outer platform extends circumferentially about the centerline and forms an outer peripheral boundary of the flowpath through the vane array. The vanes extend across the flowpath between the inner platform and the outer platform. The vanes include a first vane and a second vane. The heat exchanger includes a first vane passage and a second vane passage fluidly coupled with and downstream of the first vane passage. The first vane passage extends through the first vane. The second vane passage extends through the second vane.

According to another aspect of the present disclosure, another assembly is provided for a gas turbine engine. This engine assembly includes an inner wall, an outer wall, a first vane, a second vane and a fluid circuit. The inner wall extends circumferentially about a centerline and forms an inner peripheral boundary of a flowpath. The outer wall extends circumferentially about the inner wall and forms an outer peripheral boundary of the flowpath. The first vane extends across the flowpath between the inner wall and the outer wall. The first vane includes a first vane passage. The second vane extends across the flowpath between the inner wall and the outer wall. The second vane includes a second vane passage. The fuel circuit is configured to flow fuel sequentially through the first vane passage and the second vane passage.

According to still another aspect of the present disclosure, another assembly is provided for a gas turbine engine. This engine assembly includes a vane array, a heat exchanger and a fuel circuit. The vane array includes an inner platform, an outer platform and a plurality of vanes. The inner platform extends circumferentially about a centerline and forms an inner peripheral boundary of a flowpath through the vane array. The outer platform extends circumferentially about the centerline and forms an outer peripheral boundary of the flowpath through the vane array. The vanes extends across the flowpath between the inner platform and the outer platform. The heat exchanger is integrated with the vane array. The heat exchanger includes a first plenum, a second plenum and a plurality of vane passages fluidly coupled in parallel between the first plenum and the second plenum. Each of the vane passages extends through a respective one of the vanes. The fuel circuit is configured to direct fuel from the first plenum, through the vane passages, to the second plenum.

The first vane may be configured to exchange heat energy between compressed air flowing through the flowpath and the fuel flowing through the first vane passage. The second vane may be configured to exchange additional heat energy between the compressed air flowing through the flowpath and the fuel flowing through the second vane passage.

The first vane may be axially offset from the second vane along the centerline.

The first plenum may be formed by and/or radially outboard of the outer platform. In addition or alternatively, the second plenum may be formed by and/or radially inboard of the inner platform.

The first plenum may be formed by and/or radially inboard of the inner platform. In addition or alternatively, the second plenum may be formed by and/or radially outboard of the outer platform.

The vane array may also include a plurality of second vanes extending across the flowpath between the inner platform and the outer platform. The heat exchanger may also include a third plenum and a plurality of second vane passages fluidly coupled in parallel between the second plenum and the third plenum. Each of the second vane passages may extend through a respective one of the second vanes. The fuel circuit may also be configured to direct the fuel from the second plenum, through the second vane passage, to the third plenum.

The engine assembly may also include a fuel source, a fuel injector and a fuel circuit extending from the fuel source, sequentially through the first vane passage and the second vane passage, to the fuel injector.

The fuel source may be configured as or otherwise include a hydrogen fuel source.

The engine assembly may also include a fuel circuit configured to flow fuel sequentially through the first vane passage and the second vane passage. The first vane may be configured to transfer heat energy from compressed air flowing through the flowpath into the fuel flowing through the first vane passage. The second vane may be configured to transfer additional heat energy from the compressed air flowing through the flowpath into the fuel flowing through the second vane passage.

The fuel may be or otherwise include hydrogen fuel.

The heat exchanger may also include an inter-passage plenum formed by the inner platform. The inter-passage plenum may fluidly couple the first vane passage to the second vane passage.

The heat exchanger may also include an inlet plenum formed by the outer platform. The first vane passage may fluidly couple the inlet plenum to the second vane passage.

The heat exchanger may also include an outlet plenum formed by the outer platform. The second vane passage may fluidly couple the first vane passage to the outlet plenum.

The heat exchanger may also include an inlet manifold and an inter-passage manifold. The first vane may be one of a plurality of first vanes. The first vane passage may be one of a plurality of first vane passages. Each of the first vane passages may extend through a respective one of the first vanes. The first vane passages may be fluidly coupled in parallel between the inlet manifold and the inter-passage manifold.

The heat exchanger may also include an inlet manifold and an inter-passage manifold. The first vane passage may be one of a plurality of first vane passages. Each of the first vane passages may extend through the first vane. The first vane passages may be fluidly coupled in parallel between the inlet manifold and the inter-passage manifold.

The heat exchanger may also include an inter-passage manifold and an outlet manifold. The second vane may be one of a plurality of second vanes. The second vane passage may be one of a plurality of second vane passages. Each of the second vane passages may extend through a respective one of the second vanes. The second vane passages may be fluidly coupled in parallel between the inter-passage manifold and the outlet manifold.

The heat exchanger may also include an inter-passage manifold and an outlet manifold. The second vane passage may be one of a plurality of second vane passages. Each of the second vane passages may extend through the second vane. The second vane passages may be fluidly coupled in parallel between the inter-passage manifold and the outlet manifold.

The first vane may be longitudinally offset from the second vane along the flowpath.

The first vane may be upstream of the second vane along the flowpath.

The vane array may be configured as a double vane array.

The engine assembly may also include a compressor section of the gas turbine engine. The vane array may be arranged within the compressor section.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
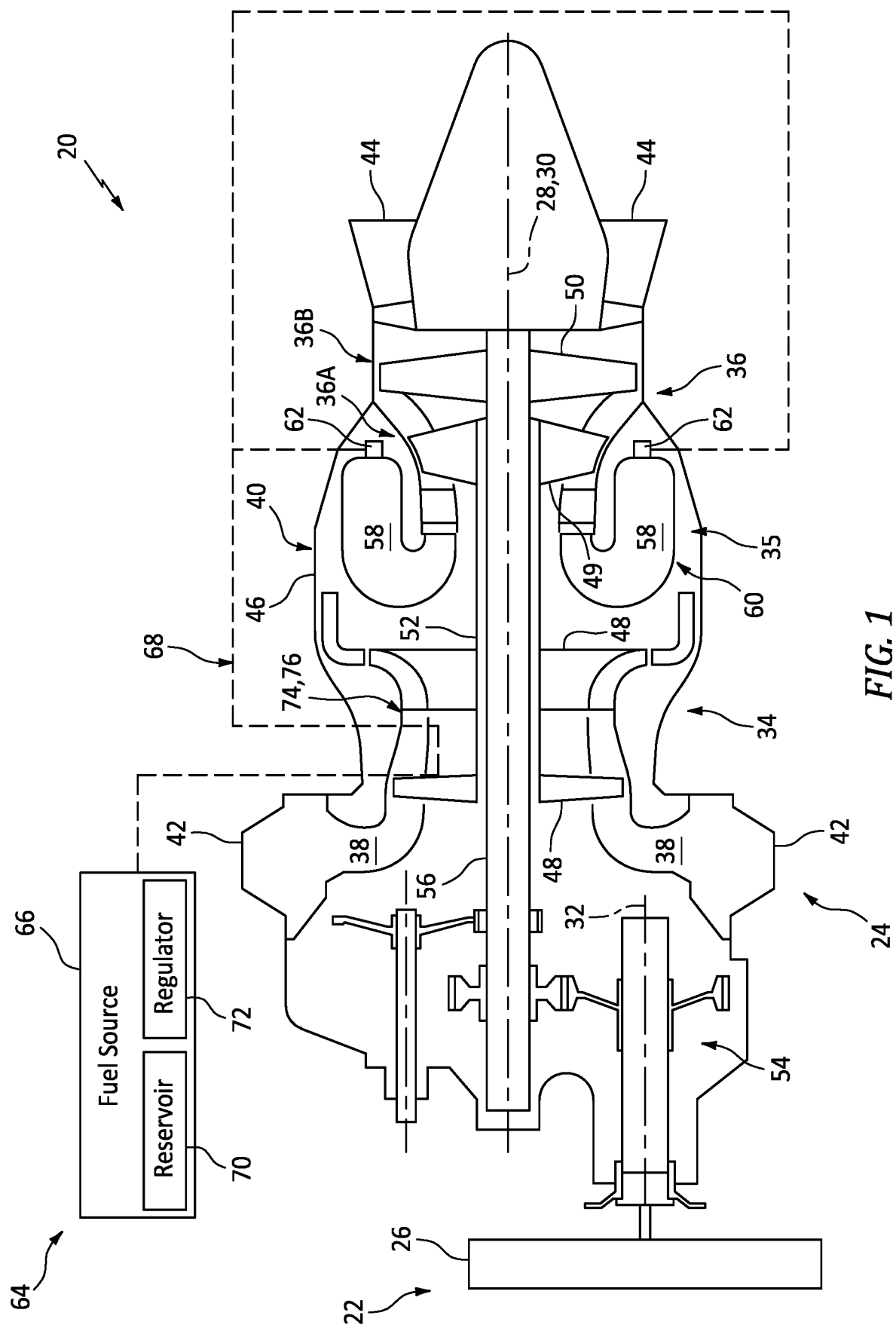
FIG. 1 is a schematic side sectional illustration of a gas turbine engine.

FIG. 1 is a schematic side sectional illustration of a gas turbine engine 20. This gas turbine engine 20 includes a mechanical load 22 and a gas turbine engine core 24.

The mechanical load 22 may be configured as or otherwise include at least (or only) one driven rotor 26. This driven rotor 26 may be a bladed propulsor rotor for an aircraft propulsion system. The driven rotor 26, for example, may be a propeller rotor where the gas turbine engine 20 is configured as a turboprop gas turbine engine. The driven rotor 26 may alternatively be a helicopter rotor (e.g., a main rotor) where the gas turbine engine 20 is configured as a turboshaft gas turbine engine. The present disclosure, how- ever, is not limited to turboprop and turboshaft gas turbine engine applications. The gas turbine engine 20, for example, may alternatively be configured as a turbofan gas turbine engine and the bladed rotor may be a fan rotor. In another example, the gas turbine engine 20 may be configured as a turbojet gas turbine engine and the bladed rotor may be a compressor rotor. Furthermore, the present disclosure is not limited to aircraft propulsion system applications. The driven rotor 26, for example, may alternatively be a generator rotor where the gas turbine engine 20 is included in a power generation system for an aircraft or non-aircraft application; e.g., an auxiliary power unit (APU) or an industrial powerplant.

The engine core 24 of FIG. 1 extends axially along an axial centerline 28 of the engine core 24. This axial centerline 28 may be coaxial with a rotational axis 30 of one or more rotors included in the engine core 24. The axial centerline 28 may also be parallel with a rotational axis 32 of the driven rotor 26. The engine core 24 of FIG. 1 includes a compressor section 34, a combustor section 35 and a turbine section 36. The turbine section 36 includes a high pressure turbine (HPT) section 36A and a low pressure turbine (LPT) section 36B.

The engine sections 34-36B are arranged sequentially along a (e.g., annular) core flowpath 38 and within an engine housing 40. This core flowpath 38 extends longitudinally within the engine core 24 from an upstream airflow inlet 42 into the engine core 24 to a downstream airflow exhaust 44 from the engine core 24. Here, the airflow inlet 42 is also an inlet into the gas turbine engine 20 and the exhaust 44 is also an exhaust from the gas turbine engine 20; however, the present disclosure is not limited to such an exemplary arrangement. The engine housing 40 of FIG. 1 includes an engine case 46 (e.g., a core case) housing the compressor section 34, the combustor section 35 and the turbine section 36.

The compressor section 34, the HPT section 36A and the LPT section 36B each include one or more bladed rotors 48-50. Each of these bladed rotors 48-50 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The compressor rotor 48 is connected to and driven by the HPT rotor 49 through a high speed shaft 52. At least (or only) the compressor rotor 48, the HPT rotor 49 and the high speed shaft 52 may collectively form a high speed rotating structure that is rotatable about the rotational axis 30. The driven rotor 26 of FIG. 1 is connected to an output of a geartrain 54. An input of the geartrain 54 is connected to the LPT rotor 50 through a low speed shaft 56. At least (or only) the LPT rotor 50 and the low speed shaft 56 may collectively form a low speed rotating structure that is rotatable about the rotational axis 30. Each of the engine shafts 52, 56 are rotatably supported by a plurality of bearings (not shown in FIG. 1 for ease of illustration). Each of these bearings is connected to the engine housing 40 by an internal engine support structure.

During gas turbine engine operation, air enters the engine core 24 through the airflow inlet 42 and enters the core flowpath 38. The air within the core flowpath 38 may be referred to as "core air". This core air is compressed by the compressor rotor 48 and directed into a (e.g., annular) combustion chamber 58 of a (e.g., annular) combustor 60 in the combustor section 35. Fuel is injected into the combustion chamber 58 through one or more fuel injectors 62 and mixed with the compressed core air to provide a fuel-air mixture. This fuel-air mixture is ignited and combustion products thereof flow through and sequentially cause the HPT rotor 49 and the LPT rotor 50 to rotate. The rotation of the HPT rotor 49 drives rotation of the compressor rotor 48 and, thus, compression of the air received from the airflow inlet 42. The rotation of the LPT rotor 50 drives rotation of the driven rotor 26.

The gas turbine engine 20 includes a fuel system 64 to provide the fuel to the one or more fuel injectors 62. The fuel provided to the fuel injectors 62 may be a non-hydrocarbon fuel such as, but not limited to, hydrogen fuel (e.g., $H_2$). This hydrogen fuel may be injected into the combustion chamber 58 as a gaseous fuel of hydrogen gas, or as a mixed phase fuel including both gaseous and liquid hydrogen, to facilitate combustion. However, gaseous hydrogen has a significantly lower density than liquid hydrogen. Therefore, to increase fuel storage capacity while reducing storage volume, the hydrogen fuel may be stored in a completely or substantially liquid phase. To facilitate the foregoing, the fuel system 64 of FIG. 1 includes a fuel source 66, a fuel circuit 68 and the one or more fuel injectors 62.

The fuel source 66 is configured to provide the fuel to the fuel circuit 68. The fuel source 66 is also configured to contain and hold a quantity of the fuel prior to, during and/or after gas turbine engine operation. The fuel source 66 of FIG. 1, for example, includes a fuel reservoir 70 and/or a fuel regulator 72. The fuel reservoir 70 may be configured as or otherwise include a container such as, but not limited to, a tank, a cylinder, a pressure vessel and/or a bladder. The fuel regulator 72 may be configured as or otherwise include a pump and/or a valve. The fuel regulator 72 may thereby direct a metered flow of the fuel from the fuel reservoir 70 to the fuel circuit 68.

The fuel circuit 68 is configured to direct the fuel from the fuel source 66 to the fuel injectors 62. The fuel circuit 68, for example, provides a fuel flowpath that extends from an outlet of the fuel source 66 to an inlet of each fuel injector 62. The fuel circuit 68 is also configured to raise a temperature of the fuel as the fuel is directed from the fuel source 66 to the fuel injectors 62. The fuel circuit 68 of FIG. 1, in particular, includes at least (or only) one heat exchanger 74 (schematically shown) configured to heat the fuel directed to the fuel injectors 62.

Figure 2:
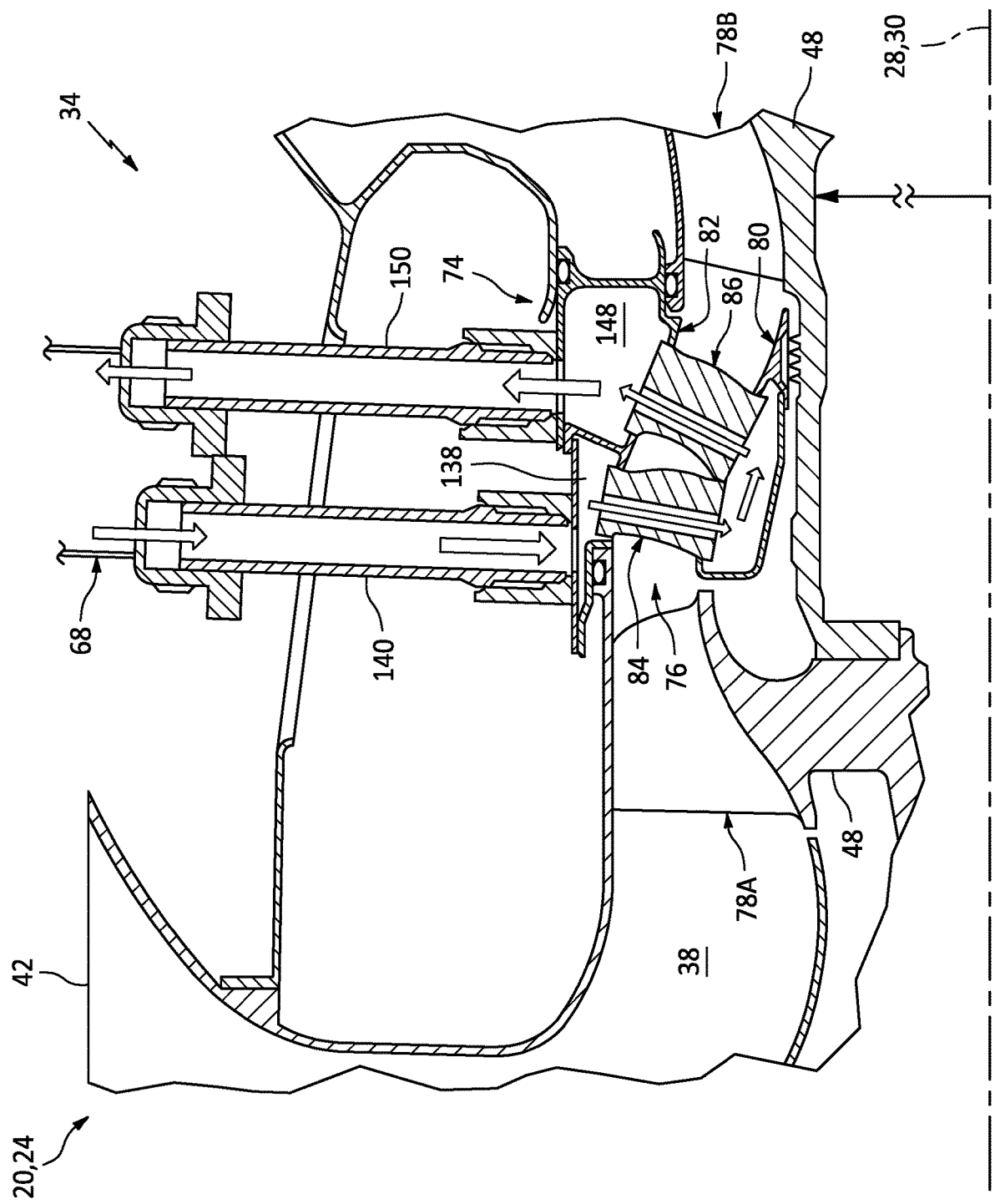
FIG. 2 is a side sectional illustration of a compressor section with an integrated heat exchanger.

Referring to FIG. 2, to reduce overall engine weight, size and/or part count as well as simply engine assembly, the heat exchanger 74 may be arranged with/included as a part of another internal component of the gas turbine engine 20 and its engine core 24. The heat exchanger 74 of FIG. 2, in particular, is integrated with (e.g., configured as part of, configured in, combined with, etc.) a stator vane array 76 within the compressor section 34; e.g., between stages 78A and 78B of the compressor rotor 48. This stator vane array 76 may be configured as a double vane array. The stator vane array 76 of FIG. 2, for example, includes an inner platform 80, an outer platform 82, one or more first vanes 84 and one or more second vanes 86.

Figure 3A:
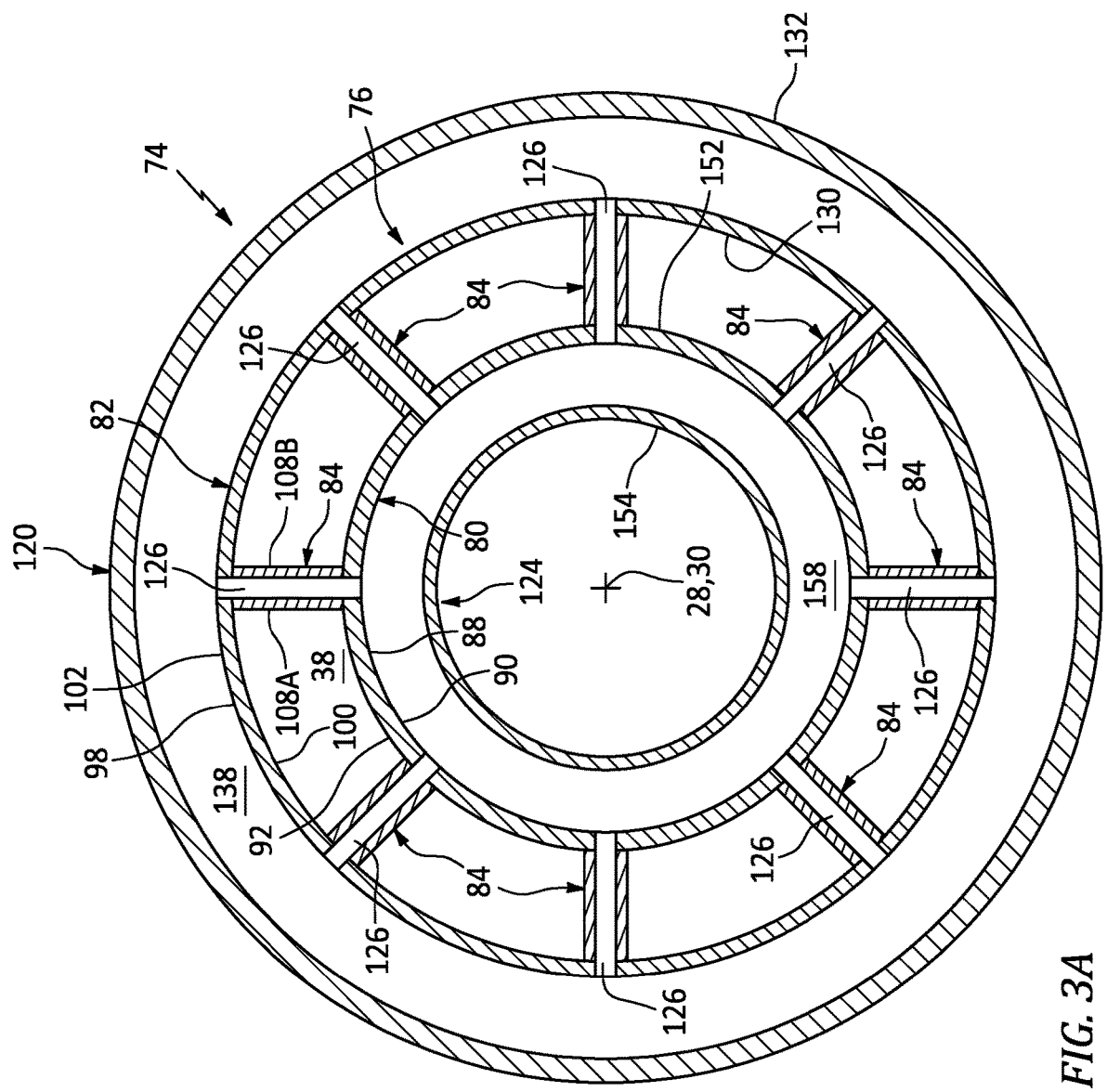
FIGS. 3A and 3B are cross-sectional illustrations at different locations through the heat exchanger.
Figure 3B:
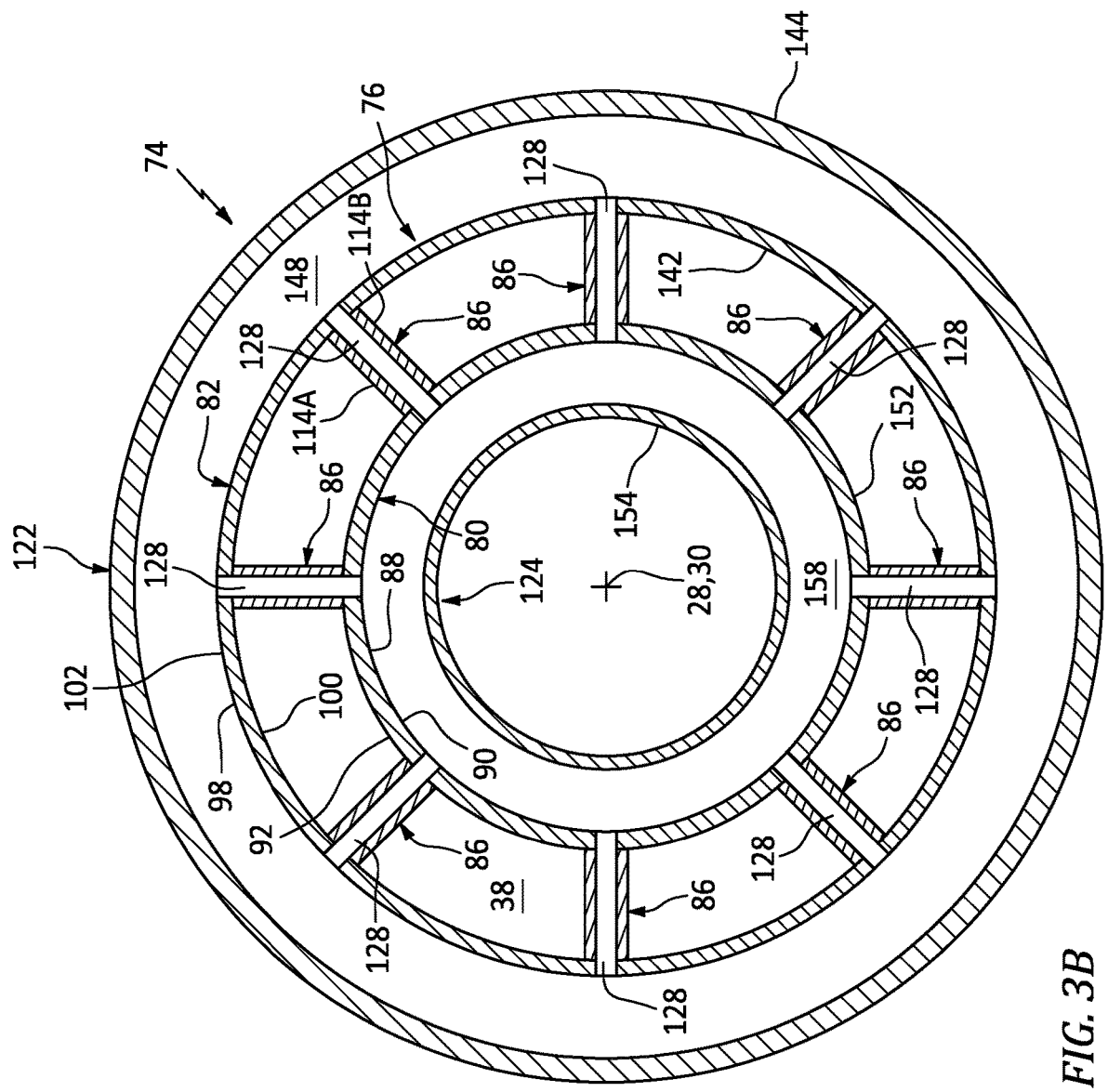
Figure 4:
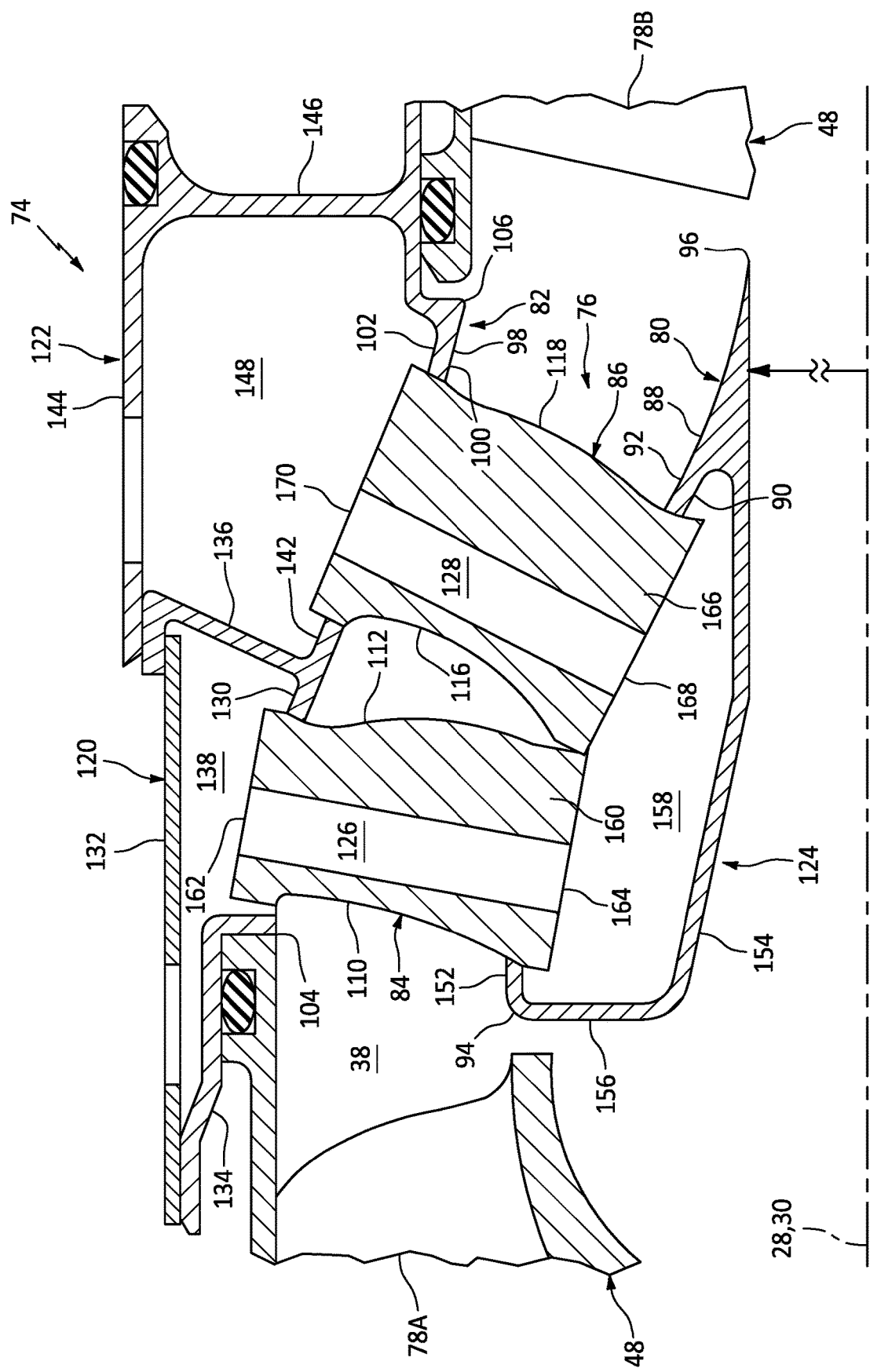
FIG. 4 is a side sectional illustration of an enlarged portion of the compressor section with the heat exchanger.

The inner platform 80 of FIGS. 3A and 3B is configured as or otherwise includes an inner flowpath wall 88; e.g., an inner shroud. The inner platform 80 and its inner flowpath wall 88 extend circumferentially about (e.g., completely around) the axial centerline 28, which may thereby provide the inner platform 80/the inner flowpath wall 88 with a full-hoop (e.g., tubular) body. The inner flowpath wall 88 extends radially between and to an inner side 90 of the inner flowpath wall 88 and an outer side 92 of the inner flowpath wall 88. At the wall outer side 92, the inner platform 80 and its inner flowpath wall 88 may form an inner peripheral boundary of the core flowpath 38 through the stator vane array 76. Referring to FIG. 4, the inner flowpath wall 88 extends longitudinally along the core flowpath 38 (e.g., axially along the axial centerline 28) between and to a forward, upstream end 94 of the inner flowpath wall 88 and an aft, downstream end 96 of the inner flowpath wall 88.

The outer platform 82 of FIGS. 3A and 3B is configured as or otherwise includes an outer flowpath wall 98; e.g., an outer shroud. The outer platform 82 and its outer flowpath wall 98 extend circumferentially about (e.g., completely around) the axial centerline 28, which may thereby provide the outer platform 82/the outer flowpath wall 98 with a full-hoop (e.g., tubular) body. The outer flowpath wall 98 extends radially between and to an inner side 100 of the outer flowpath wall 98 and an outer side 102 of the outer flowpath wall 98. At the wall inner side 100, the outer platform 82 and its outer flowpath wall 98 may form an outer peripheral boundary of the core flowpath 38 through the stator vane array 76. The outer platform 82 and its outer flowpath wall 98 also circumscribes the inner platform 80 and its inner flowpath wall 88 as well as an array of the first vanes 84 (e.g., see FIG. 3A) and an array of the second vanes 86 (e.g., see FIG. 3B). Referring to FIG. 4, the outer flowpath wall 98 extends longitudinally along the core flowpath 38 (e.g., axially along the axial centerline 28) between and to a forward, upstream end 104 of the outer flowpath wall 98 and an aft, downstream end 106 of the outer flowpath wall 98.

Referring to FIG. 3A, the first vanes 84 are arranged circumferentially about the axial centerline 28 in the array. Each of the first vanes 84 extends radially between and to the inner flowpath wall 88 and the outer flowpath wall 98. Each of the first vanes 84 is also connected to (e.g., formed integral with or otherwise attached to) the inner flowpath wall 88 and the outer flowpath wall 98. With this arrangement, each of the first vanes 84 extends (e.g., generally radially) across the core flowpath 38 between the inner platform 80 and the outer platform 82. Each of the first vanes 84 extends laterally (e.g., generally circumferentially) between opposing sides 108A and 108B (generally referred to as "108") of that respective first vane 84. Referring to FIG. 4, each of the first vanes 84 extends longitudinally (e.g., generally axially) from a leading edge 110 of that respective first vane 84 to a trailing edge 112 of that respective first vane 84, where the first vane sides 108 (see FIG. 3A) extend longitudinally between and meet at the first vane leading edge 110 and the first vane trailing edge 112.

Referring to FIG. 3B, the second vanes 86 are arranged circumferentially about the axial centerline 28 in the array. Each of the second vanes 86 extends radially between and to the inner flowpath wall 88 and the outer flowpath wall 98. Each of the second vanes 86 is also connected to (e.g., formed integral with or otherwise attached to) the inner flowpath wall 88 and the outer flowpath wall 98. With this arrangement, each of the second vanes 86 extends (e.g., generally radially) across the core flowpath 38 between the inner platform 80 and the outer platform 82. Each of the second vanes 86 extends laterally (e.g., generally circumferentially) between opposing sides 114A and 114B (generally referred to as "114") of that respective second vane 86. Referring to FIG. 4, each of the second vanes 86 extends longitudinally (e.g., generally axially) from a leading edge 116 of that respective second vane 86 to a trailing edge 118 of that respective second vane 86, where the second vane sides 114 (see FIG. 3B) extend longitudinally between and meet at the second vane leading edge 116 and the second vane trailing edge 118.

The first vanes 84 may be arranged at (e.g., on, adjacent or proximate) the upstream ends 94 and 104 of the flowpath walls 88 and 98. The second vanes 86 may be arranged at the downstream ends 96 and 106 of the flowpath walls 88 and 98. The first vanes 84 and the second vanes 86 may thereby be staged longitudinally along the core flowpath 38 and/or axially along the axial centerline 28. The first vanes 84 of FIG. 4, for example, are arranged upstream of the second vanes 86 along the core flowpath 38. The present disclosure, however, is not limited to such an exemplary arrangement. Furthermore, each first vane 84 may be circumferentially aligned with a respective one of the second vanes 86 about the axial centerline 28. However, in other embodiments, the first vanes 84 may be circumferentially offset from the second vanes 86.

The heat exchanger 74 of FIG. 4 includes an outer inlet manifold 120, an outer outlet manifold 122 and an inner manifold 124; e.g., an inter-passage manifold. This heat exchanger 74 also includes one or more first vane passages 126 and one or more second vane passages 128.

The inlet manifold 120 may be configured with the outer platform 82. The inlet manifold 120 of FIG. 4, for example, includes an inlet manifold inner wall 130, an inlet manifold outer wall 132, an inlet manifold endwall 134 and a manifold divider wall 136. Here, the inlet manifold inner wall 130 is configured as a forward, upstream section of the outer flowpath wall 98; however, the present disclosure is not limited to such an exemplary arrangement. Each of the inlet manifold walls 130, 132, 134 and 136 may extend circumferentially about (e.g., completely around) the axial centerline 28, which may thereby provide the inlet manifold 120 and its walls 130, 132, 134 and 136 with a full-hoop (e.g., annular) configuration. The inlet manifold endwall 134 extends (e.g., radially and/or axially) between and is connected to the inlet manifold inner wall 130 and the inlet manifold outer wall 132. The manifold divider wall 136 extends (e.g., radially and/or axially) between and is connected to the inlet manifold inner wall 130 and the inlet manifold outer wall 132. With this arrangement, the inlet manifold walls 130, 132, 134 and 136 collectively form an outer inlet plenum 138 (e.g., an interior cavity) within the inlet manifold 120.

The inlet plenum 138 extends radially within the inlet manifold 120 between and to the inlet manifold inner wall 130 and the inlet manifold outer wall 132. The inlet plenum 138 extends axially within the inlet manifold 120 between and to the inlet manifold endwall 134 and the manifold divider wall 136. The inlet plenum 138 further extends circumferentially within the inlet manifold 120 about (e.g., completely around) the axial centerline 28. The inlet plenum 138 of FIG. 2 is fluidly coupled with an upstream section of the fuel circuit 68 through an inlet fuel line 140 (e.g., a conduit, a pipe, a tube, a hose, etc.), or through multiple (e.g., parallel) inlet fuel lines.

The outlet manifold 122 of FIG. 4 may be configured with the outer platform 82. The outlet manifold 122 of FIG. 4, for example, includes an outlet manifold inner wall 142, an outlet manifold outer wall 144, an outlet manifold endwall 146 and the manifold divider wall 136. Here, the outlet manifold inner wall 142 is configured as an aft, downstream section of the outer flowpath wall 98; however, the present disclosure is not limited to such an exemplary arrangement. Each of the outlet manifold walls 136, 142, 144, 146 may extend circumferentially about (e.g., completely around) the axial centerline 28, which may thereby provide the outlet manifold 122 and its walls 136, 142, 144, 146 with a full-hoop (e.g., annular) configuration. The outlet manifold endwall 146 extends (e.g., radially and/or axially) between and is connected to the outlet manifold inner wall 142 and the outlet manifold outer wall 144. The manifold divider wall 136 further extends (e.g., radially and/or axially) out to and is connected to the outlet manifold outer wall 144. With this arrangement, the outlet manifold walls 136, 142, 144, 146 collectively form an outer outlet plenum 148 (e.g., an interior cavity) within the outlet manifold 122.

The outlet plenum 148 extends radially within the outlet manifold 122 between and to the outlet manifold inner wall 142 and the outlet manifold outer wall 144. The outlet plenum 148 extends axially within the outlet manifold 122 between and to the outlet manifold endwall 146 and the manifold divider wall 136. The outlet plenum 148 further extends circumferentially within the outlet manifold 122 about (e.g., completely around) the axial centerline 28. The outlet plenum 148 of FIG. 2 is fluidly coupled with a downstream section of the fuel circuit 68 through an outlet fuel line 150 (e.g., a conduit, a pipe, a tube, a hose, etc.), or through multiple (e.g., parallel) outlet fuel lines.

Referring to FIG. 4, the inner manifold 124 may be configured with the inner platform 80. The inner manifold 124 of FIG. 4, for example, includes an inner manifold outer wall 152, an inner manifold inner wall 154 and an inner manifold endwall 156. Here, the inner manifold outer wall 152 is configured as at least section or an entirety of the inner flowpath wall 88; however, the present disclosure is not limited to such an exemplary arrangement. Each of the inner manifold walls 152, 154 and 156 may extend circumferentially about (e.g., completely around) the axial centerline 28, which may thereby provide the inner manifold 124 and its walls 152, 154 and 156 with a full-hoop (e.g., annular) configuration. The inner manifold endwall 156 extends (e.g., radially) between and is connected to the inner manifold outer wall 152 and the inner manifold inner wall 154. The inner manifold outer wall 152 and the inner manifold inner wall 154 may (e.g., radially) converge and meet at (e.g., on, adjacent or proximate) the downstream end 96 of the inner flowpath wall 88. With such an arrangement, the inner manifold walls 152, 154 and 156 collectively form an inner plenum 158/an inter-passage plenum (e.g., an interior cavity) within the inner manifold 124.

The inner plenum 158 extends radially within the inner manifold 124 between and to the inner manifold outer wall 152 and the inner manifold inner wall 154. The inner plenum 158 may extend axially within the inner manifold 124 between and to the inner manifold endwall 156 and the inner manifold outer wall 152. The inner plenum 158 further extends circumferentially within the inner manifold 124 about (e.g., completely around) the axial centerline 28.

Each of the first vane passages 126 may be formed by a respective one of the first vanes 84. Each first vane passage 126 of FIG. 4, for example, is formed by an internal bore through the respective first vane 84. This internal bore may be formed by a tubular vane sidewall 160 of the respective first vane 84, which vane sidewall 160 also partially or completely forms an exterior of the respective first vane 84. The internal bore and, thus, the respective first vane passage 126 extend through the respective first vane 84 between an inlet 162 to that first vane passage 126 and an outlet 164 from that first vane passage 126. The first vane passage inlet 162 is fluidly coupled with the inlet plenum 138. The first vane passage outlet 164 is fluidly coupled with the inner plenum 158. With such an arrangement, the first vane passages 126 of FIG. 3A may be fluidly coupled in parallel between the inlet plenum 138 and the inner plenum 158.

Referring to FIG. 4, each of the second vane passages 128 may be formed by a respective one of the second vanes 86. Each second vane passage 128 of FIG. 4, for example, is formed by an internal bore through the respective second vane 86. This internal bore may be formed by a tubular vane sidewall 166 of the respective second vane 86, which vane sidewall 166 also partially or completely forms an exterior of the respective second vane 86. The internal bore and, thus, the respective second vane passage 128 extend through the respective second vane 86 between an inlet 168 to that second vane passage 128 and an outlet 170 from that second vane passage 128. The second vane passage inlet 168 is fluidly coupled with the inner plenum 158. The second vane passage outlet 170 is fluidly coupled with the outlet plenum 148. With such an arrangement, the second vane passages 128 of FIG. 3B may be fluidly coupled in parallel between the inner plenum 158 and the outlet plenum 148.

During heat exchanger operation, the inlet plenum 138 of FIG. 4 may receive fuel from the fuel source 66 (see FIG. 1) through the inlet fuel line(s) 140 (see FIG. 2). This fuel is flows within the inlet plenum 138 and is distributed to the first vane passages 126. The fuel flows through the first vane passages 126 into the inner plenum 158, thereby crossing the core flowpath 38 in a (e.g., radial) inward direction. The inner plenum 158 collects the fuel from the first vane passages 126 and redistributes this fuel to the second vane passages 128. The fuel flows through the second vane passages 128 into the outlet plenum 148, thereby crossing the core flowpath 38 in a (e.g., radial) outward direction. The outlet plenum 148 collects the fuel from the second vane passages 128 and directs this fuel through the outlet fuel line(s) 150 (see FIG. 2) for provision to the fuel injectors 62 (see FIG. 1).

Various members of the heat exchanger 74 may provide a conductive path between the compressed core air flowing through the stator vane array 76 and the fuel flowing through the heat exchanger 74. One or more or all of the heat exchanger members 130, 152, 160 and/or 166 of FIG. 4, for example, may facilitate heat energy transfer from the compressed core air into the fuel and the compressed core air and the fuel flow along those heat exchanger members 130, 152, 160 and/or 166. The fuel flowing through the heat exchanger 74 may thereby be heated using heat energy from the compressed core air.

Figure 5:
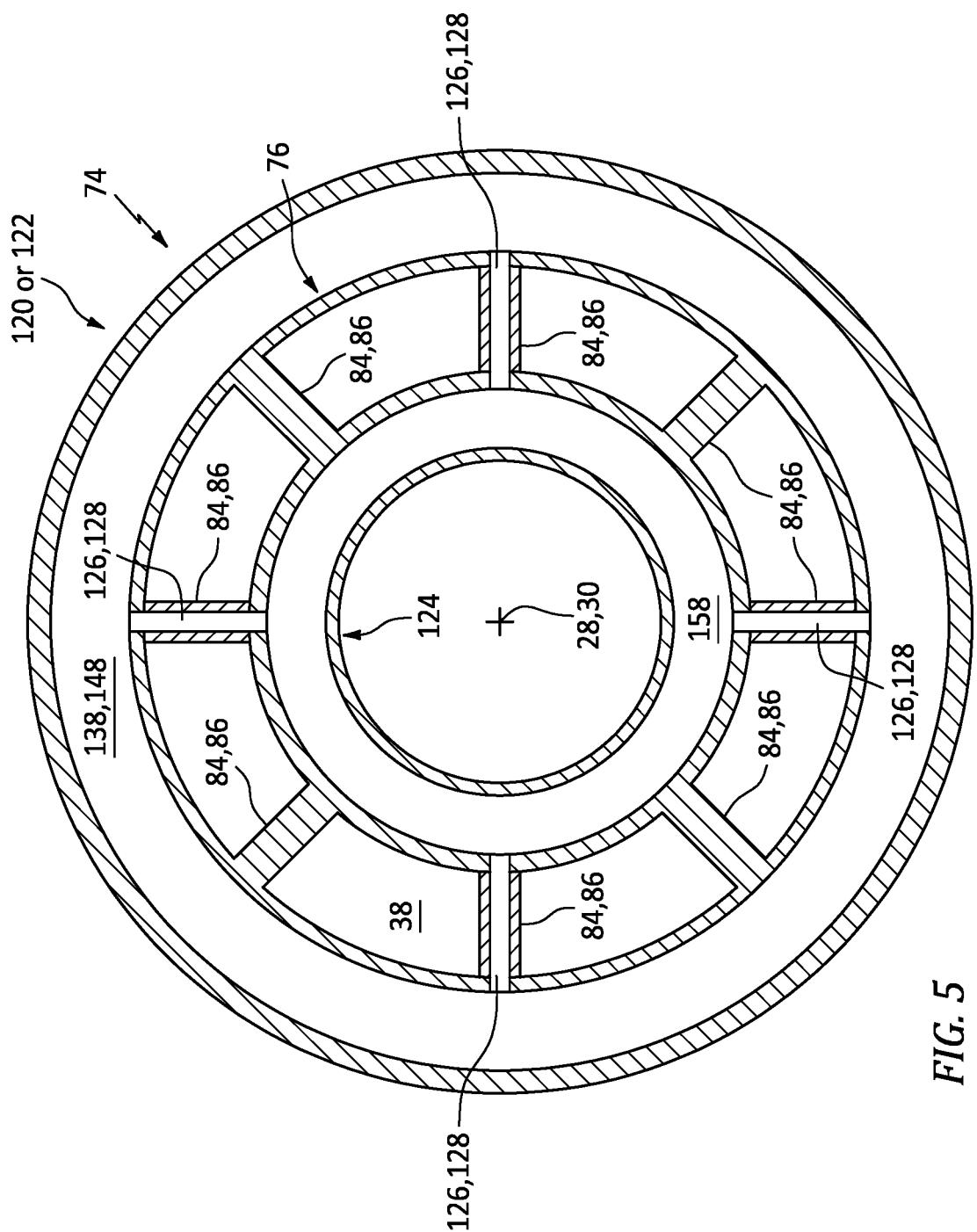
FIG. 5 is a cross-sectional illustration of the heat exchanger with another arrangement of vane passages.

In some embodiments, referring to FIG. 3A, 3B, each vane 84, 86 may be configured with a respective passage 126, 128. In other embodiments, referring to FIG. 5, a select subset of one or more of the vanes 84, 86 may each be configured with a respective passage 126, 128, while one or more of the other vanes 84, 86 may each be configured without a passage. For example, every other one of the vanes 84, 86 may be configured with a respective passage 126, 128.

Figure 6:
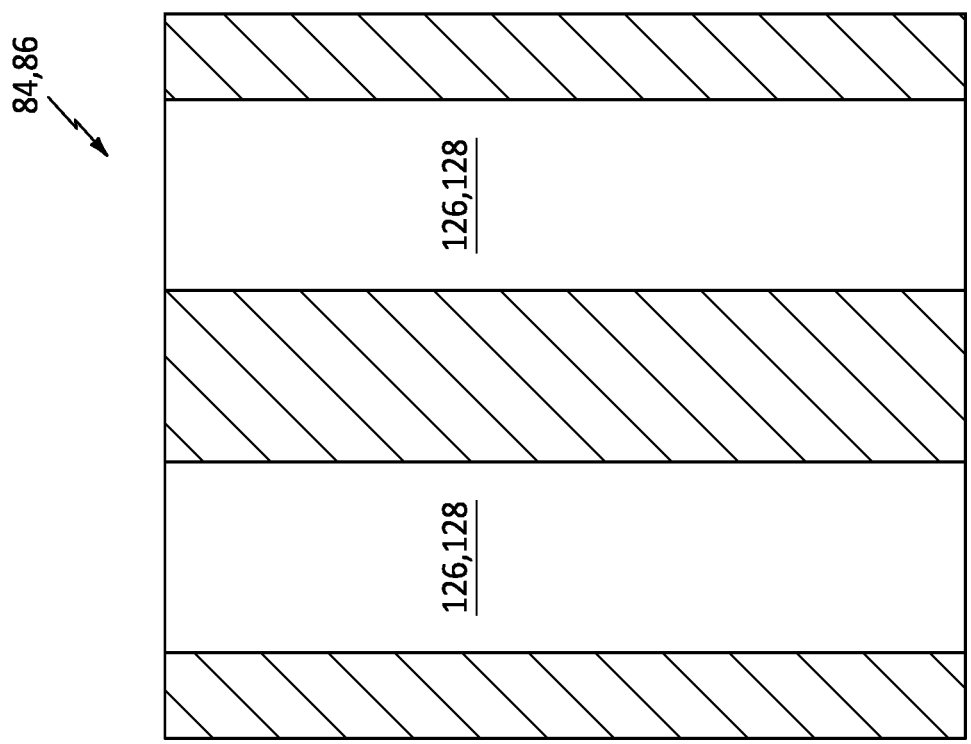
FIG. 6 is a side sectional illustration of a vane with multiple vane passages.

In some embodiments, referring to FIG. 4, each vane 84, 86 may be configured with a single passage 126, 128 extending therethrough. In other embodiments, referring to FIG. 6, one or more or all of the vanes 84, 86 may each be configured with multiple passages 126, 128 extending therethrough. These passages 126, 128 may be fluidly coupled in parallel between the plenums 138 and 158, 158 and 148 (see FIG. 4).

Figure 7:
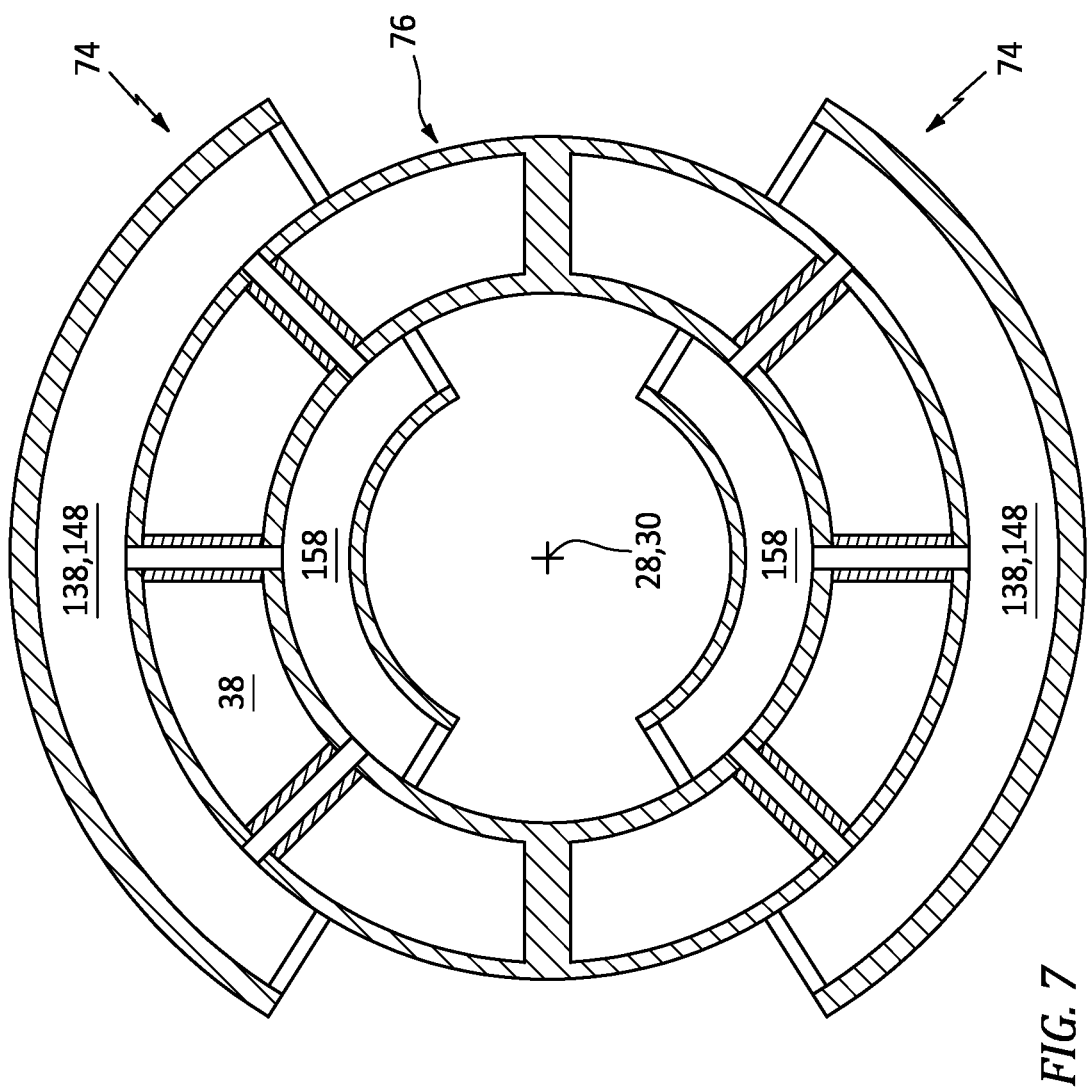
FIG. 7 is a cross-sectional illustration of a vane array with multiple integral heat exchangers.

In some embodiments, each of the plenums 138, 148, 158 may be annular and extend circumferentially around the axial centerline 28. In other embodiments, referring to FIG. 7, one or more or all of the plenums 138, 148 and 158 may each be arcuate and extend partially circumferentially about the axial centerline 28. In such embodiments, the stator vane array 76 may be configured with one or more of the heat exchangers 74 arranged circumferentially about the axial centerline 28.

The fuel is described above as a non-hydrocarbon fuel such as hydrogen fuel. It is contemplated, however, the fuel system 64 may alternatively heat and then provide various other fuels, including hydrocarbon fuel, to the fuel injectors 62.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a gas turbine engine, comprising:
    a bladed rotor;
    a double vane array including an inner platform, an outer platform and a plurality of vanes, the plurality of vanes including a first vane and a second vane, the inner platform extending circumferentially about an axial centerline of the gas turbine engine and forming an inner peripheral boundary of a core flowpath through the double vane array, the outer platform extending circumferentially about the axial centerline and forming an outer peripheral boundary of the core flowpath through the double vane array, the plurality of vanes extending across the core flowpath between the inner platform and the outer platform, and the plurality of vanes arranged downstream of a stage of the bladed rotor along the core flowpath; and
    a heat exchanger integrated with the double vane array, the heat exchanger including a first vane passage and a second vane passage fluidly coupled with and downstream of the first vane passage, the first vane passage extending radially through the first vane, and the second vane passage extending radially through the second vane, wherein the heat exchanger further includes an inter-passage plenum formed by the inner platform, and wherein the inter-passage plenum fluidly couples the first vane passage to the second vane passage;
    a fuel circuit configured to flow fuel sequentially through the first vane passage and the second vane passage;
    wherein the first vane passage extends along a first straight vane passage central longitudinal axis, through the outer platform, and through the inner platform;
    wherein the second vane passage extends along a second straight vane passage longitudinal axis, through the outer platform, and through the inner platform;
    wherein the first straight vane passage central longitudinal axis forms a first acute angle with the axial centerline of the gas turbine engine;
    wherein the second straight vane passage central longitudinal axis forms a second acute angle with the axial centerline of the gas turbine engine; and
    wherein the first acute angle is different than the second acute angle.
2. The assembly of claim 1, further comprising:
    a fuel source;

a fuel injector; and the fuel circuit extending from the fuel source, sequentially through the first vane passage and the second vane passage, to the fuel injector.

3. The assembly of claim 2, wherein the fuel source comprises a hydrogen fuel source.

4. The assembly of claim 1, further comprising:

the bladed rotor configured as a compressor rotor;

the first vane configured to transfer heat energy from compressed air flowing through the core flowpath into the fuel flowing through the first vane passage; and the second vane configured to transfer additional heat energy from the compressed air flowing through the core flowpath into the fuel flowing through the second vane passage.

5. The assembly of claim 1, wherein the heat exchanger further includes an inlet plenum formed by the outer platform; and the first vane passage fluidly couples the inlet plenum to the second vane passage.

6. The assembly of claim 1, wherein the heat exchanger further includes an outlet plenum formed by the outer platform; and the second vane passage fluidly couples the first vane passage to the outlet plenum.

7. The assembly of claim 1, wherein the heat exchanger further includes an inlet manifold and the inter-passage plenum;

the first vane is one of a plurality of first vanes; the first vane passage is one of a plurality of first vane passages;

each of the plurality of first vane passages extends through a respective one of the plurality of first vanes; and the plurality of first vane passages are fluidly coupled in parallel between the inlet manifold and the inter-passage plenum.

8. The assembly of claim 1, wherein the heat exchanger further includes an inlet manifold and the inter-passage plenum;

the first vane passage is one of a plurality of first vane passages;

each of the plurality of first vane passages extends through the first vane; and the plurality of first vane passages are fluidly coupled in parallel between the inlet manifold and the inter-passage plenum.

9. The assembly of claim 1, wherein the heat exchanger further includes the inter-passage plenum and an outlet manifold;

the second vane is one of a plurality of second vanes;

the second vane passage is one of a plurality of second vane passages;

each of the plurality of second vane passages extends through a respective one of the plurality of second vanes; and the plurality of second vane passages are fluidly coupled in parallel between the inter-passage plenum and the outlet manifold.

10. The assembly of claim 1, wherein the heat exchanger further includes the inter-passage plenum and an outlet manifold;

the second vane passage is one of a plurality of second vane passages;

each of the plurality of second vane passages extends through the second vane; and the plurality of second vane passages are fluidly coupled in parallel between the inter-passage plenum and the outlet manifold.

11. The assembly of claim 1, wherein the first vane is longitudinally offset from the second vane along the core flowpath.

12. The assembly of claim 1, wherein the first vane is upstream of the second vane along the core flowpath.

13. The assembly of claim 1, further comprising:

a compressor section of the gas turbine engine;

the bladed rotor and the double vane array arranged within the compressor section.

14. The assembly of claim 1, wherein the plurality of vanes are further arranged upstream of another stage of the bladed rotor along the core flowpath.

15. The assembly of claim 1, wherein either or both of the first vane passage and the second vane passage comprise an internal bore through the first vane and/or the second vane, respectively.

16. The assembly of claim 1, wherein the double vane array includes a first vane array and a second vane array, the first vane array includes a first set of the plurality of vanes, including the first vane, the second vane array includes a second set of the plurality of vanes, including the second vane, and a downstream end of the first vane array is adjacent an upstream end of the second vane array along the core flowpath.

17. An assembly for a gas turbine engine, comprising:

an inner wall extending circumferentially about an axial centerline of the gas turbine engine and forming an inner peripheral boundary of a core flowpath;

an outer wall extending circumferentially about the inner wall and forming an outer peripheral boundary of the core flowpath;

a double vane array, the double vane array including a first vane and a second vane, the first vane extending across the core flowpath between the inner wall and the outer wall, the first vane comprising a first vane passage, the second vane extending across the core flowpath between the inner wall and the outer wall, the second vane comprising a second vane passage, and a leading edge of the second vane axially adjacent a trailing edge of the first vane along the axial centerline;

a fuel circuit configured to flow fuel sequentially longitudinally through the first vane passage and longitudinally through the second vane passage; and an inter-passage plenum fluidly coupling the first vane passage to the second vane passage;

wherein the first vane passage extends along a first straight vane passage central longitudinal axis, through the outer platform, and through the inner platform;

wherein the second vane passage extends along a second straight vane passage longitudinal axis, through the outer platform, and through the inner platform;

wherein the first straight vane passage central longitudinal axis forms a first acute angle with the axial centerline of the gas turbine engine;

wherein the second straight vane passage central longitudinal axis forms a second acute angle with the axial centerline of the gas turbine engine; and wherein the first acute angle is different than the second acute angle.

18. The assembly of claim 17, wherein the first vane is configured to exchange heat energy between compressed air flowing through the core flowpath and the fuel flowing through the first vane passage; and the second vane is configured to exchange additional heat energy between the compressed air flowing through the core flowpath and the fuel flowing through the second vane passage.

19. An assembly for a gas turbine engine, comprising:

a double vane array including an inner platform, an outer platform and a plurality of vanes, the inner platform extending circumferentially about an axial centerline of the gas turbine engine and forming an inner peripheral boundary of a core flowpath through the double vane array, the outer platform extending circumferentially about the axial centerline and forming an outer peripheral boundary of the core flowpath through the double vane array, the plurality of vanes extending across the core flowpath between the inner platform and the outer platform, and a first of the plurality of vanes axially offset from a second of the plurality of vanes along the axial centerline;

a heat exchanger integrated with the double vane array, the heat exchanger including a first plenum, a second plenum, and an inter-passage plenum, and a plurality of vane passages fluidly coupled in parallel between the first plenum and the second plenum via the inter-passage plenum, and each of the plurality of vane passages extending radially through a respective one of the plurality of vanes; and a fuel circuit configured to direct fuel from the first plenum, through the plurality of vane passages, to the second plenum;

wherein a first vane of the double vane array includes a first vane passage extending along a first straight vane central longitudinal axis, through the outer platform, and through the inner platform;

wherein a second vane of the double vane array includes a second vane passage extending along a second straight vane central longitudinal axis, through the outer platform, and through the inner platform;

wherein the first straight vane passage central longitudinal axis forms a first acute angle with the axial centerline of the gas turbine engine;

wherein the second straight vane passage central longitudinal axis forms a second acute angle with the axial centerline of the gas turbine engine; and wherein the first acute angle is different than the second acute angle.

20. The assembly of claim 19, further comprising:

a compressor section comprising a first compressor stage and a second compressor stage;

the plurality of vanes located between the first compressor stage and the second compressor stage along the core flowpath.

* * * * *